US012462540B2

(12) United States Patent
Liu et al.

(10) Patent No.: US 12,462,540 B2
(45) Date of Patent: Nov. 4, 2025

(54) ALGORITHM EVALUATION SYSTEM AND TEST METHOD FOR PERFORMANCE TEST OF PERSON AND CERTIFICATE VERIFICATION DEVICE

(71) Applicant: The Third Research Institute of Ministry of Public Security, Shanghai (CN)

(72) Inventors: Caixia Liu, Shanghai (CN); Fangyi Xie, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 364 days.

(21) Appl. No.: 18/014,043

(22) PCT Filed: Jan. 28, 2021

(86) PCT No.: PCT/CN2021/074024
§ 371 (c)(1),
(2) Date: Dec. 30, 2022

(87) PCT Pub. No.: WO2022/001097
PCT Pub. Date: Jan. 6, 2022

(65) Prior Publication Data
US 2023/0267715 A1   Aug. 24, 2023

(30) Foreign Application Priority Data
Jun. 30, 2020   (CN) .......................... 202010623037.5

(51) Int. Cl.
G06V 10/776   (2022.01)
G06F 21/33    (2013.01)
G06V 40/16    (2022.01)

(52) U.S. Cl.
CPC ............ *G06V 10/776* (2022.01); *G06F 21/33* (2013.01); *G06V 40/172* (2022.01)

(58) Field of Classification Search
CPC .. G06V 10/776; G06V 40/172; G06V 10/993; G06V 40/161; G06V 40/168; G06V 40/45; G06F 21/33
See application file for complete search history.

(56) References Cited

FOREIGN PATENT DOCUMENTS

CN       110532856 A   * 12/2019

OTHER PUBLICATIONS

Shang-Hung Lin et al. ("Face Recognition/Detection by Probabilistic Decision-Based Neural Network, Jan. 1997, IEEE Transactions on Neural Networks, vol. 8, No. 1" (Year: 1997).*

(Continued)

*Primary Examiner* — Michael Horabik
*Assistant Examiner* — Phuong Hau Cai
(74) *Attorney, Agent, or Firm* — John P. White

(57) ABSTRACT

An algorithm evaluation system and a test method for performance test of a person and certificate verification device are provided. A large-scale face test database and a preprocessed face database captured by a device on site can be called according to a configuration rule, face data can be sequentially pushed to the device under test for face recognition, calling is performed to control through a test function interface, and a test result such as feature extraction and feature comparison of the device under test is obtained. A face recognition performance indicator test that can take into account both hardware and software factors of the person and certificate verification device can be implemented.

10 Claims, 5 Drawing Sheets

(56) References Cited

OTHER PUBLICATIONS

"Yongkang Wong et al., Patch-based Probabilistic Image Quality Assessment for Face Selection and Improved Video-based Face Recognition, Aug. 2011, CVPR 2011 Workshops, Colorado Springs, CO, USA" (Year: 2011).*

* cited by examiner

ALGORITHM EVALUATION SYSTEM AND TEST METHOD FOR PERFORMANCE TEST OF PERSON AND CERTIFICATE VERIFICATION DEVICE

TECHNICAL FIELD

The present invention relates to person and certificate verification devices or performance indicator test technologies of person and certificate verification devices, and specifically, to person and certificate verification devices or face recognition performance indicators "false acceptance rate (FAR) and false rejection rate (FRR)" of person and certificate verification devices.

BACKGROUND

The facial recognition technology, as the most common biometric recognition mode in the field of biometric recognition, has been widely applied to many industries and fields in recent years. Based on the face recognition technology, a recognition object is compared with an image in a certificate of the object and/or an electronic image in a chip of a certificate of the object. As a typical type of device in many face recognition applications, a person and certificate verification device that verifies whether a person under test is consistent with certificate information of the person or identity information claimed by the person is widely applied to occasions that require personnel identity verification and management control, such as entry and exit passenger identity verification, identity verification of visitors to important places, identity verification of hotel check-in personnel, identity verification of financial services in the financial industry, identity verification of social security personnel, and identity verification of examinees in examination rooms, to achieve identity verification of relevant personnel and achieve the purpose of security protection.

Due to the particularity of actual usage environments, users have high expectations for the face recognition performance of this type of device. Therefore, high requirements are also put forward for the face recognition technology used by this type of device. Driven by demand, the scale of biometric recognition market has grown rapidly in China, and research and development enterprises and institutions relevant to face recognition products have continued to emerge. However, manufactured person and certificate verification devices include both high and low quality products. Therefore, there is an urgent need for effective means to reasonably evaluate the face recognition performance of this type of device.

SUMMARY

The present invention designs an algorithm evaluation system for face recognition performance indicator test of a person and certificate verification device, and provides a test method for face recognition performance indicator test of a person and certificate verification device by using the algorithm evaluation system. Based on the algorithm evaluation system and the test method provided by the present invention, the face recognition performance of the person and certificate verification device can be effectively and accurately tested and evaluated.

The algorithm evaluation system and the test method designed by the present invention are suitable for various devices that perform person and certificate verification through the face recognition technology, and are not only suitable for a type of device that compares consistency between a person under test and certificate information of the person, but also suitable for a type of device that compares consistency between a person under test and identity information claimed by the person. The certificate information includes all certificates of face image information of relevant persons, such as second-generation resident ID cards, passports, social security cards, people's police ID cards, student ID cards, employee ID cards, and visitor cards. The claimed identity information includes all information that can be traced back to face image information of relevant persons, such as person's names, ID card numbers, social security card numbers, people's police ID numbers, student ID card numbers, employee ID card numbers, and visitor card numbers.

The algorithm evaluation system for performance test of a person and certificate verification device designed by the present invention includes: a database calling module, a data preprocessing module, a device interface debugging module, an automatic test module, a quality evaluation module, a data set management module, and an image algorithm module; where the device interface debugging module can debug an interface function of the device under test through an API dynamic link database file and an algorithm configuration file provided by a manufacturer of a device under test, and is configured to: in an automatic test process of the automatic test tool module, push face images in a target set and a test set to the device under test to run a face recognition algorithm and obtain a test result;

the test database calling module, the data preprocessing module, and the data set management module cooperate to form a systematic data set source, and can be configured to download a large-scale face test database and/or collect and preprocess an on-site face test database;

in a computer or server environment, the automatic test module is configured to call, through a test program, a face recognition algorithm running on the device under test, to perform performance indicator test of "false acceptance rate (FAR) and false rejection rate (FRR)"; and the quality evaluation module can call the image algorithm module to perform face image quality evaluation performance indicator test on an on-site living body face image collected by the device under test, and can perform face image quality evaluation performance indicator test on a certificate visual face image collected by the device under test.

In addition, the evaluation system further includes a function module configured to perform user hierarchical right management, and the function module includes one or more of a user login module, a project registration module, and a user management module.

The evaluation system includes an information statistics collection module configured to perform data analysis and processing of test results, and the information statistics collection module includes one or more of a test result module, a project management module, a project statistics collection module, and an algorithm statistics collection module.

The automatic test module, the device interface calling module, the data preprocessing module, the database calling module, and the data set management module in the system cooperate to perform "false acceptance rate (FAR) and false rejection rate (FRR)" performance test on the device under test.

The device interface calling module obtains a face recognition algorithm test interface of the device under test; the data preprocessing module preprocesses a face image captured by the device under test on site and then uses the preprocessed face image as an on-site capturing database in a current test database; the data calling module calls and downloads the database required for the current test; the data set management module sets a data security mechanism to manage a total test database of the current test, and the automatic test module calls the above modules to perform "false acceptance rate (FAR) and false rejection rate (FRR)" performance test.

The quality evaluation module, the device interface calling module, the data preprocessing module, and the image algorithm module cooperate to perform image quality evaluation on the face image captured by the device under test on site.

The device interface calling module obtains and uploads a living body face image, a certificate image, or a certificate visual face image captured by the device under test on site; the data preprocessing module performs test such as face test on the image obtained by the device interface calling module; the image quality evaluation module performs face image quality evaluation on an uploaded image by calling the image algorithm module, the image algorithm module performs, according to a specified technical requirement, automatic test on the face image captured on site and exported by the device under test, and the quality evaluation module performs analysis processing in cooperation with data generated by the image algorithm module and provides a compliance evaluation.

The test method for performance test of a person and certificate verification device provided by the present invention includes:
  sequentially pushing, to a device under test according to a configuration rule, a downloaded large-scale face test database and a preprocessed database captured by a device on site, to perform a face algorithm operation; and
  calling to control through a test function interface and obtaining a test result such as feature extraction and feature comparison of the device under test, to perform performance indicator test.

The test method includes performing face image quality performance test on the device under test, including:
  performing, through an image algorithm according to a specified technical requirement, automatic test on a living body face image captured on site, and obtaining an image quality evaluation result through analysis processing by a quality evaluation module; and
  performing automatic test on a captured certificate visual face image through an image algorithm according to a specified technical requirement, and obtaining an image quality evaluation result through analysis processing by the quality evaluation module.

In the test method, test databases are downloaded according to a data security mechanism and are sequentially pushed to the device under test according to a configuration rule, to perform a face algorithm operation, and encryption and desensitization of face image data are performed based on a mapping relationship; and it is ensured that face data in a called face test database cannot be reused after being exported from the device under test, thereby ensuring secure usage of the face data in the face test database.

Further, the test method includes specific test steps of false acceptance rate (FAR) and false rejection rate (FRR) performance indicator test of various person and certificate verification devices.

The algorithm evaluation system and the test method designed in the present invention can perform intelligent and automatic test of performance indicators of face image quality and "false acceptance rate (FAR) and false rejection rate (FRR)" of a person and certificate verification device, reduce the requirement on the technical capability of working personnel and labor costs of this type of test, and greatly improve the test efficiency.

Further, the test method provided by the present invention comprehensively takes into account the impact of hardware facilities of the person and certificate verification device on recognition performance while evaluating performance of the face recognition algorithm of the person and certificate verification device. In specific test applications, the method can support test databases of tens of millions and above, and support multi-platform and multi-thread synchronous operation. On the premise of ensuring secure usage of face information data in the test database, the method implements intelligence and automation of a test process, standardization and transparency of a test procedure, and intuitiveness and traceability of a test result. This not only greatly improves the test efficiency, but also improves the fairness and rationality of a performance test result of the person and certificate verification device. The method is of great importance to the promotion of technological progress of person and certificate verification devices and further widespread application of person and certificate verification devices.

In addition, the algorithm evaluation system and the test method are suitable for various devices that perform person and certificate verification through the face recognition technology, and are not only suitable for a type of device that compares consistency between a person under test and certificate information of the person, but also suitable for a type of device that compares consistency between a person under test and identity information claimed by the person. The certificate information includes all certificates of face image information of relevant persons, such as second-generation resident ID cards, passports, social security cards, people's police ID cards, student ID cards, employee ID cards, and visitor cards. The claimed identity information includes all information that can be traced back to face image information of relevant persons, such as person's names, ID card numbers, social security card numbers, people's police ID numbers, student ID card numbers, employee ID card numbers, and visitor card numbers.

In addition, the algorithm evaluation system and the test method are compatible with multiple types of operating systems, support multi-thread operation and support offline automatic test, and can be applied to various products that use face biometrics for identity authentication such as person and certificate verification devices in the hotel industry, entry and exit face recognition devices, face recognition access control all-in-one machines, face recognition gates, face recognition checkpoint cameras, face recognition attendance machines, and face recognition payment systems. The test method based on the algorithm evaluation system can greatly simplify the test operation process and significantly improve the test efficiency of person and certificate verification devices while ensuring scientific and fair performance test results of person and certificate verification devices to the maximum extent.

BRIEF DESCRIPTION OF THE DRAWINGS

The present invention will be further described below in conjunction with the accompanying drawings and specific embodiments.

DETAILED DESCRIPTION

In order to make the technical means, creative features, goals and effects achieved by the algorithm evaluation system and the test method designed by the present invention easy to understand, the present invention will be further described below in conjunction with specific diagrams.

As the scale of public test databases of face recognition algorithms becomes larger and larger, combined with actual usage of devices, the scale of test databases generally reaches the level of 10,000 and above. For this reason, it is difficult to implement a test method for a large number of real persons in device performance test, and the existing test solution of 20 real person test cannot adapt to efficient and effective performance test of person and certificate verification devices or 1:1 person and certificate verification devices.

Therefore, the present invention designs an algorithm evaluation system that takes into account both an algorithm and hardware performance of a person and certificate verification device, and a test method for face recognition performance indicator evaluation based on the system.

Figure 1:
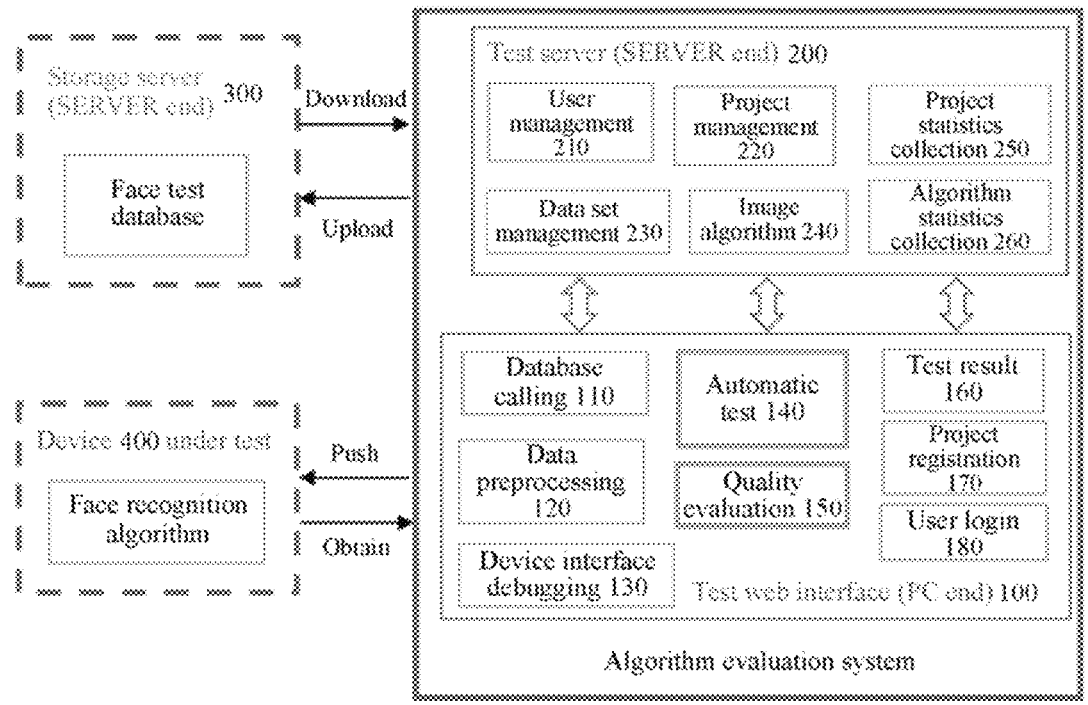
FIG. 1 is a schematic structural diagram of an algorithm evaluation system according to the present invention.

FIG. 1 is a schematic structural diagram of an algorithm evaluation system for performance indicator test of a person and certificate verification device according to the present invention.

As shown in FIG. 1, the system is based on a B/S architecture and implements an evaluation function through a web access operation. The system includes a test operation end (PC end) 100 and a test server (SERVER end) 200, which are implemented in cooperation with a storage server (SERVER end) 300 at the same time.

In some specific implementations, the test operation end (PC end) 100 includes a corresponding PC, accesses the test server (SERVER terminal) 200 in the form of web, and provides a test operation WEB interface to a user. At the same time, the test WEB operation interface (PC end) 100 includes functional modules such as a database calling module 110, a data preprocessing module 120, a device interface debugging module 130, an automatic test module 140, a quality evaluation module 150, a test result module 160, a user login module 170, and a project registration module 180. Users can perform test operations on a device under test on a visual interface through these functional modules, to perform relevant performance indicator test.

Correspondingly, functional modules such as a user management module 210, a project management module 220, a data set management module 230, an image algorithm module 240, a project statistics collection module 250, and an algorithm statistics collection module run in the test server (SERVER end) 200. The test server (SERVER end) 200 can be configured to interact with the storage server (SERVER end) 300 storing a face test database, to perform comprehensive management of data sets and test processes.

Figure 2:
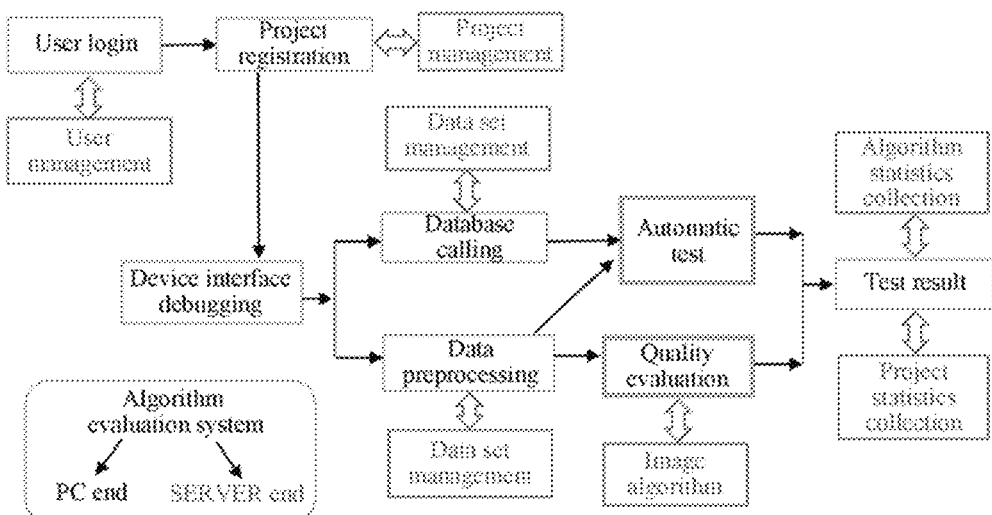
FIG. 2 is a diagram of a logic relationship of an algorithm evaluation system according to the present invention.

FIG. 2 is a diagram of a logic relationship of an algorithm evaluation system according to the present invention.

As shown in FIG. 2, the device interface debugging module 130 in the solution of this embodiment is located on the test WEB interface (PC end) 100, and is configured to debug a test interface with a device 400 under test. The device interface debugging module 130 can call a test interface function through an API dynamic link database and an algorithm configuration file provided by a device manufacturer, and dock with the automatic test module to ensure that after a face image in a target set and a test set is pushed to the device under test to run a face recognition algorithm, a test result is obtained.

In this solution, the database calling module 110 and the data preprocessing module 120 run on the test WEB interface (PC end) 100, while the data set management module 230 runs on the test server (SERVER end) 200. At the same time, the three modules cooperate with each other to form a test database source for the algorithm evaluation system.

As an example, the test database source herein may include a downloaded large-scale face test database and a face database captured on site. The large-scale face test database is downloaded through interaction between the test server 200 and the storage server (SERVER end) 300. The face database captured on site is obtained by calling a test interface by the PC end 100 and the device 400 under test.

Face data of the face database captured on site is test person face images captured on site by the device under test, and is preprocessed by the data preprocessing module 120.

The database calling module 110 prepares to download data sets in batches from the storage server for the current test according to a configuration rule. The data sets include a target set and a test set.

The data set management module 230 can manage the data set formed by face images captured on site and prepared by the data preprocessing module. In a specific example, the data set management module 230 downloads a corresponding data set from the test database according to a percentage based on a data scale depending on a current test requirement, summarizes the downloaded data set and the data set captured on site, and uses a data set of a single person as a unit for centralized processing.

As an example, a data security mechanism is further used among the three functional modules to perform access right and supervision and control functions of the test database, and data set abnormality may be fed back and a new data set may be uploaded to the test database in an automatic test process.

The automatic test module 140 in this solution runs at the PC end and docks and cooperates with the database calling module 110 and the device interface debugging module 130 to test performance indicators of false acceptance rate (FAR) and false rejection rate (FRR) of the device under test.

The device interface debugging module 130 is configured to debug interface communication between the algorithm evaluation system and the device under test, and sequentially use, according to test steps set by the automatic test module 140, a test program to call an interface function corresponding to the face recognition algorithm of the device under test, to perform data interaction. As an example, the interface function herein includes at least functional interface functions such as an initialization algorithm, feature length obtaining, feature extraction, feature comparison and similarity returning, query, algorithm resource release, and version information obtaining.

The automatic test module 140 cooperates with the data set management module 230 to sequentially call different interface functions according to the test program through the device interface debugging module 130 for a face image that is in the data set of a single person and that corresponds to the target set and the test set, to obtain algorithm operation data of the device under test, and perform data processing on the obtained result according to the "false acceptance rate (FAR) and false rejection rate (FRR)" performance test method, to test performance indicators of "false acceptance rate (far) and false rejection rate (FRR)".

The quality evaluation module 150 in this solution runs at the PC end, and docks and cooperates with the data preprocessing module 120 and the image algorithm module 240 that runs on the test server (SERVER end) 200. The image algorithm module 240 evaluates quality of a living body face image and a certificate visual face image captured by the device under test.

The image algorithm module 240 herein is configured to perform compliance test on face images according to a relevant technical requirement in a corresponding standard, including indicators such as image format, face occlusion status, interocular distance, posture, and face area.

As an example, the image algorithm module 240 is configured to perform, according to a technical requirement of a specified standard, automatic test on the face images captured on site and exported by the device under test, and the quality evaluation module 150 performs analysis processing on the data generated by the image algorithm module and provides a compliance evaluation.

As an example, (1) the image algorithm module performs automatic test on a living body face image captured on site and exported by the device under test, and provides parameters of the face recognition image in the test set such as image format, occlusion status, interocular distance, posture, and face area; and the quality evaluation module obtains these parameters and evaluates according to corresponding indicators specified in GB/T 35678-2017.

(2) The image algorithm module performs automatic test on a visual face image captured on site and exported by the device under test, and provides parameters of the face recognition image in the target set such as image format, occlusion status, interocular distance, posture, and face area; and the quality evaluation module obtains these parameters and evaluates these parameters according to corresponding indicators specified in GB/T 35678-2017.

(3) The image algorithm module performs automatic test on a certificate image captured on site and exported by the device under test, and provides parameters of the face recognition image in the target set such as image format, occlusion status, interocular distance, posture, and face area; and the quality evaluation module obtains these parameters and evaluates these parameters according to corresponding indicators specified in GB/T 35678-2017.

In this solution, the user login module 180 and the project registration module 170 run at the PC end, and dock and cooperate with the user management module 250 and the project management module 220 running on the test server (SERVER end) 200, to perform hierarchical right management for users by the system according to conditions such as projects, algorithms, and test statuses.

As an example, the user management module 250 can be configured to manage users of the test system and assign usage rights, including users such as super administrators, data administrators, and test engineers.

Users with different rights use the user login module 180 to enter the test system and use different modules. For example, the super administrator has the highest right and can access and use all modules. The data administrator manages the data set and can access management modules relevant to data such as the data preprocessing module, the database calling module, the data set management module, and the project management module. The test engineer evaluates image quality and performs "false acceptance rate (FAR) and false rejection rate (FRR)" performance test, and can access the data preprocessing module, the database call module, the image algorithm module, the quality evaluation module, the device interface call module, and the automatic test module.

The project management module 220 performs test management on each device under test, which is managed by a super administrator and can only be viewed by a test engineer. Project registration management is for a test engineer to create a project according to the device under test, start a test task, evaluate image quality, and perform "false acceptance rate (FAR) and false rejection rate (FRR)" performance test.

The test result module 160 in this solution runs at the PC end and docks and cooperates with the project statistics collection module 250 and the algorithm statistics collection module 260 running on the test server (SERVER end) 200, and is configured to perform data analysis processing on the test result and perform classified and hierarchical statistics collection management according to different projects and algorithms.

As an example, the test result module 160 performs summarizing management on test data obtained by each device under test through the automatic test module and the image quality evaluation module.

The project statistics collection module 250 manages by using the device under test as a unit, and for each device under test, managing multiple image quality evaluations with different requirements and a number of test times of "false acceptance rate (FAR) and false rejection rate (FRR)" performance test (test task). The algorithm statistics collection module 260 uses the test task as a unit and manages test data of each image quality evaluation and "false acceptance rate (FAR) and false rejection rate (FRR)" performance test. Data of project statistics collection management and algorithm statistics collection management in this solution comes from the test result module, and is distinguished according to the above-mentioned units.

According to the algorithm evaluation system and the test method for performance test of a person and certificate verification device provided by the present invention, users can conveniently and sequentially push, to the device under test according to the configuration rule, the downloaded large-scale face test database and the preprocessed database captured by the device on site, to perform a face algorithm operation, and then call to control by using the test function interface and obtain the test result such as feature extraction and feature comparison of the device under test, so as to perform performance indicator test such as face image quality and false acceptance rate (FAR) and false rejection rate (FRR). Thus, this effectively and efficiently evaluates the face recognition performance of the person and certificate verification device.

When the algorithm evaluation system and the test method are used to test performance indicators of false acceptance rate (FAR) and false rejection rate (FRR) of the person and certificate verification device, specific operation steps and implementation solutions are as follows:

The algorithm evaluation system is initialized, the storage server and the test server are started, and the storage server and the test server are connected to a test computer.

A dll file and an algorithm configuration file of the device under test provided by a manufacturer are checked, and the device under test is started.

A preset parameter such as a face recognition comparison threshold of the device under test is queried and recorded.

According to "false acceptance rate (FAR) and false rejection rate (FRR)" performance level requirements of the device under test, a scale of the test database is selected and a number of required test persons is determined, that is, a number of test persons who are not repeated in the target set and a number of test face images in the test set.

Based on the scale of the test database, a number of data sets captured on site and a number of data sets in the downloaded face test database are determined according to a matching rule.

The data preprocessing module is used to prepare for a face data set captured on site.

The database call module is used to download a data set from the face test database according to a sample distribution requirement and a configuration rule stipulated in a standard.

The test system establishes a connection with the device under test, and uses a device interface to call a module debugging interface to ensure that interface function call and data interaction succeed.

The automatic test module is started and cooperates with the device interface calling module and the data set management module to complete the pre-test preparation.

A first stage of test is performed: feature extraction. The automatic test module drives the device interface calling module to perform initialization, call a feature extraction interface function of the device under test, and perform feature extraction for each face image in the target set and the test set in the test database managed by the data set management module. The implementation of feature extraction is run by the facial recognition algorithm of the device under test. The automatic test module performs analysis processing on information such as the face feature file database of the target set and the test set, a total number of samples, a number of successful extractions, and corresponding identifiers, checks a correspondence between the two data sets, and records and stores the correspondence.

A second stage of test is performed: feature comparison. The automatic test module drives the device interface calling module to perform initialization, call the feature comparison interface function of the device under test, and compare feature data of the detection set with feature data of the target set through a face recognition algorithm of the device under test. The automatic test module obtains a feature comparison result, and performs analysis processing on similarity and corresponding data information of each comparison whose similarity value is accurate to 0.0001.

A third stage of test is performed: "false acceptance rate (FAR) and false rejection rate (FRR)" performance test result calculation. The automatic test module comprehensively analyzes the obtained data, calculates the "FAR" and the "FRR" according to a formula, performs compliance evaluation according to a standard grade requirement, and obtains a performance test result and an ROC curve of the device under test.

The following illustrates an example of an implementation process of testing a performance indicator of a person and certificate verification device by the algorithm evaluation system for performance test of a person and certificate verification device given in this example.

Figure 3:
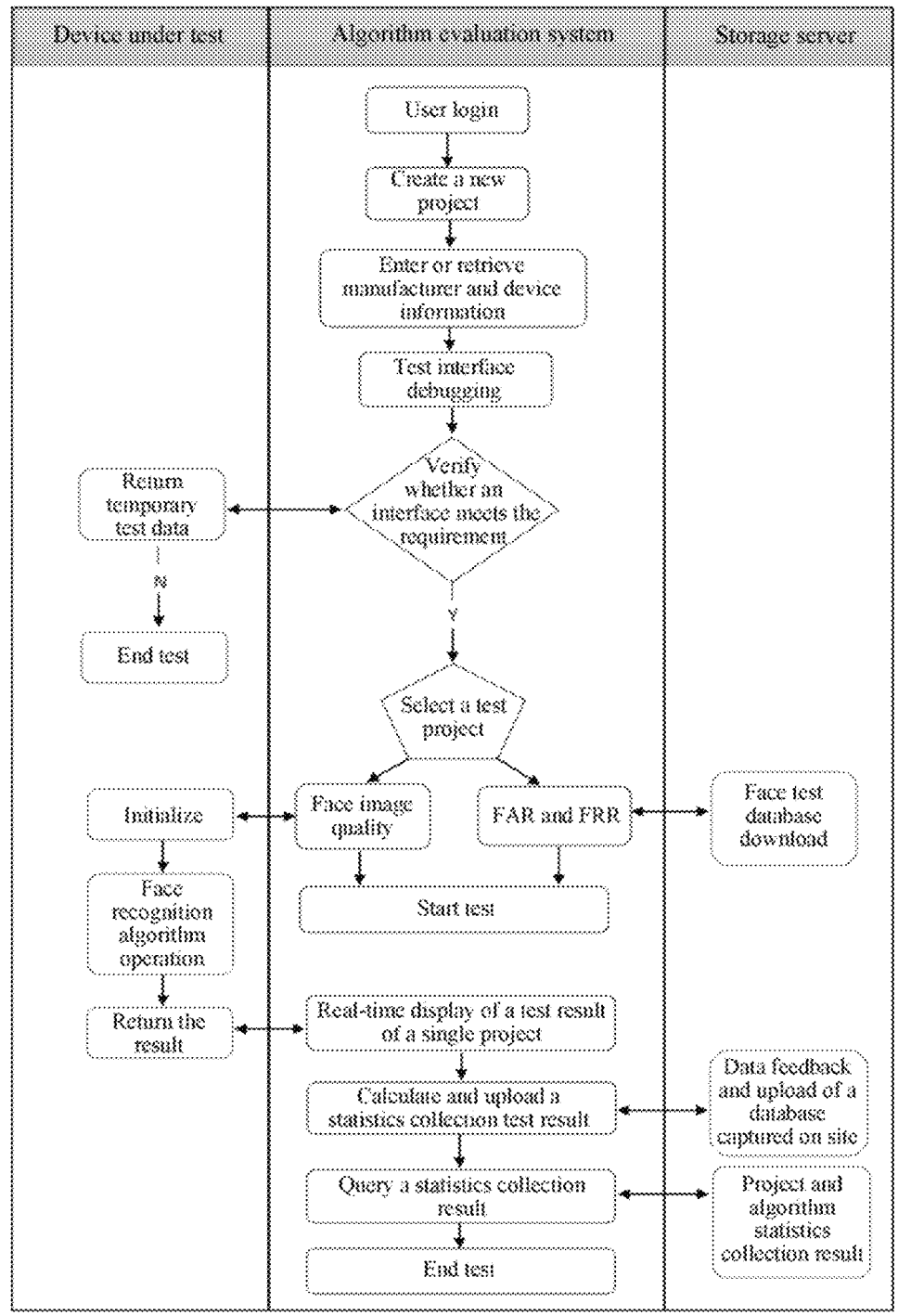
FIG. 3 is a flowchart of a test method corresponding to an algorithm evaluation system according to the present invention.

FIG. 3 shows an implementation process of testing a performance indicator of a person and certificate verification device based on the algorithm evaluation system in this example. The process mainly includes the following steps:

(1) Initialize the algorithm evaluation system according to user operations.

(2) Use a corresponding user account to log in to the system according to a user right requirement.

(3) Create a new project, input the manufacturer information and device information of the device under test, and upload the algorithm configuration file and relevant technical information of the device; at the same time, retrieve historical records according to manufacturers and device names and automatically fill in project information.

(4) Debug a test interface, select a dynamic link database and an algorithm configuration file of the device, and verify whether the interface of the device under test complies with test interface requirements in relevant industry standards and specifications such as "General Technical Requirements for Face Recognition Application of Person and Certificate Verification Device for Security and Prevention". For example, this includes at least functions such as an initialization algorithm, feature length obtaining, feature extraction, feature comparison and similarity returning, query, an algorithm resource, and version information obtaining.

(5) According to requirements of tested performance indicators, in a case of the performance test of face image quality, perform step (6); or in a case of the performance test of false acceptance rate (FAR) and false rejection rate (FRR), perform step (7).

(6) The algorithm evaluation system performs face image quality test according to performance indicator requirements relevant to the person and certificate verification device by using the data preprocessing module and the quality evaluation module at the PC end and the image algorithm module on the test server (SERVER end).

(7) The test system performs false acceptance rate (FAR) and false rejection rate (FRR) test according to performance indicator requirements relevant to a human security test device by using the automatic test module and the test result module at the PC end.

(8) Generate a test result after completing test of each test project according to a test requirement, and calculate and collect statistics on a report and upload the report to the storage server.

(9) Review data abnormality in a downloaded test database that may occur during the test and report abnormality to the storage server; review a database captured on site, and upload the database to the storage server after determining that the database is correct.

(10) According to an application requirement of the device, access the storage server and query a project and an algorithm statistics collection result.

In a more preferred implementation, this test solution can be performed through cooperation between functional modules such as the device interface calling module, the data preprocessing module, the image quality evaluation module, and the image algorithm module in the algorithm evaluation system, to test face image quality of the device under test according to a relevant performance indicator requirement of the person and certificate verification device.

As an example, during implementation, the device interface calling module obtains living body face images, certificate images, or certificate visual face images captured by the device under test on site, and uploads the obtains images to the test server (SERVER end). Correspondingly, the data preprocessing module performs test such as face test on the images obtained by the device interface calling module. The image quality evaluation module calls the image algorithm module to evaluate the face image quality of the uploaded image (the uploaded image herein is a face image directly exported by the device under test, and can be exported through software of the device under test during specific implementation, or can be directly transferred by a USB drive or a network port to a storage path of the test computer, and the image algorithm module can directly access the face image in a storage folder), and outputs the result to the PC.

Figure 4:
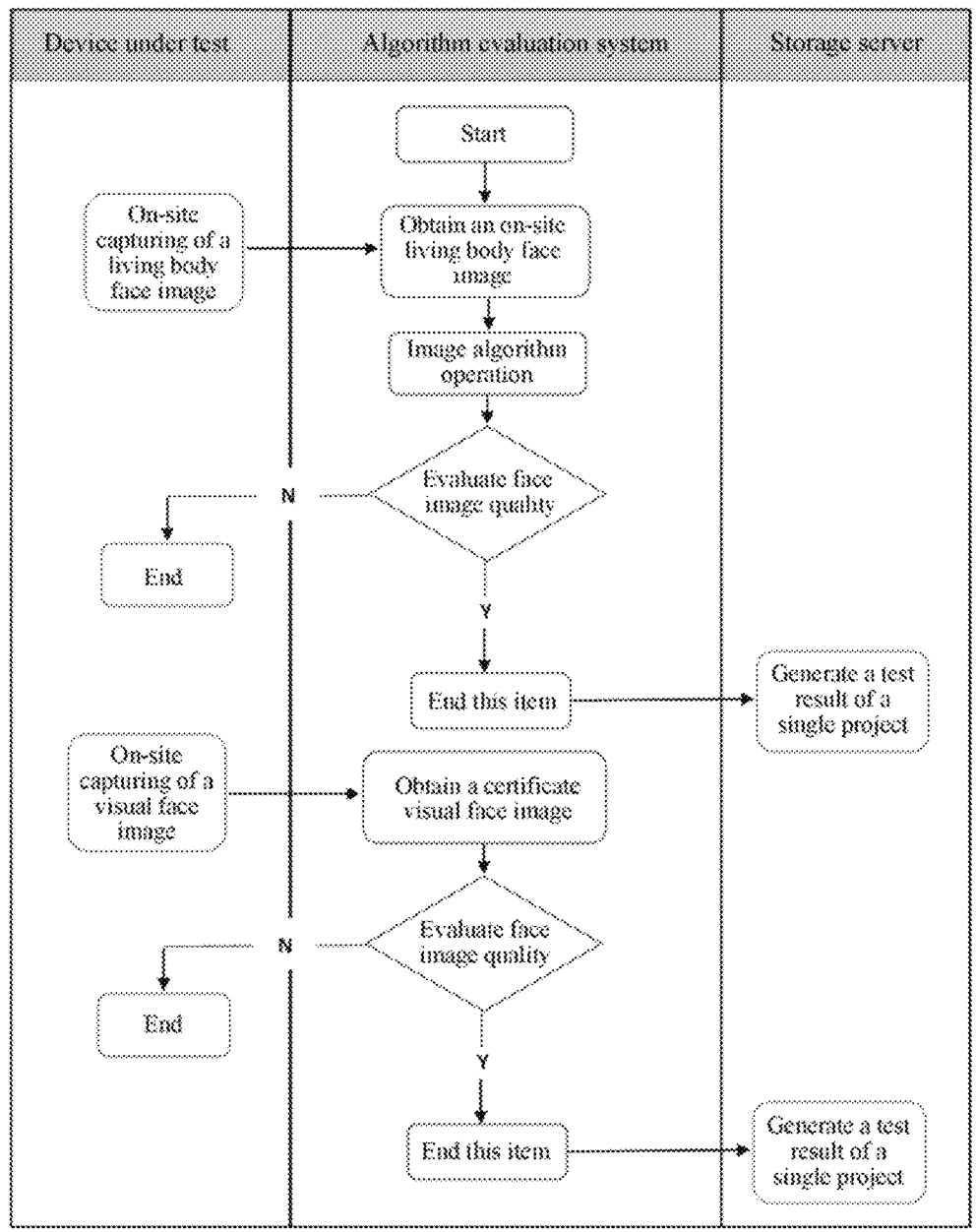
FIG. 4 is a flowchart of face image quality performance indicator test in a test method according to the present invention.

Accordingly, this example uses the algorithm evaluation system to perform a test operation on a face image quality performance indicator of the person and certificate verification device, which is mainly implemented by the following steps (refer to FIG. 4):

(6.1) Initialize the system, and operate a WEB interface at the PC end (computer) to enter an interface of the data preprocessing module.

(6.2) Use the device interface debugging module to call the device under test to capture a living body face image on site, upload the image to the PC end in an FTP mode, and obtain the on-site living body face image.

(6.2) Perform dock operation with the image algorithm module in the test server (SERVER end), start the image quality evaluation module, and evaluate the living body face image captured on site.

(6.3) For a first requirement on face image quality performance indicators: the living body face image captured on site meets relevant technical requirements of 4.2 in GB/T 35678-2017. The image quality evaluation module compares the obtained face images and determines whether the device meets the performance indicator requirement; and automatically generates a test result of a single project and stores and uploads the result.

(6.4) For a second requirement on face image quality performance indicators: the captured certificate visual face image meets relevant technical requirements of 4.2 in GB/T 35678-2017. The image quality evaluation module compares the obtained face images and determines whether the device meets the performance indicator requirement, and automatically generates a test result of a single project and stores and uploads the result.

In a more preferred implementation, this test solution may be performed through docking and cooperation between functional modules such as the device interface calling module, the data preprocessing module, the database calling module, the automatic test module, and the data set management module in the algorithm evaluation system, to perform "false acceptance rate (FAR) and false rejection rate (FRR)" performance test on the device under test.

The device interface calling module is configured to obtain the interface required for the face algorithm test of the device under test, which includes at least an initialization algorithm, feature length obtaining, feature extraction, feature comparison and similarity returning, query, algorithm resource release, and version information obtaining.

The face image captured by the data preprocessing module on site for the device under test is used as a database captured on site in the current test database. The test database includes data sets captured on site and downloaded data sets; the data sets captured on site are obtained directly from the device under test by the data preprocessing module; and the downloaded data sets are obtained from the storage server by the database calling module.

The data call module downloads the test database in the current test database, and the scale can reach 10,000 and above. As an example, the face test database stored in the storage server can be directly accessed and downloaded by the database calling module.

Figure 5:
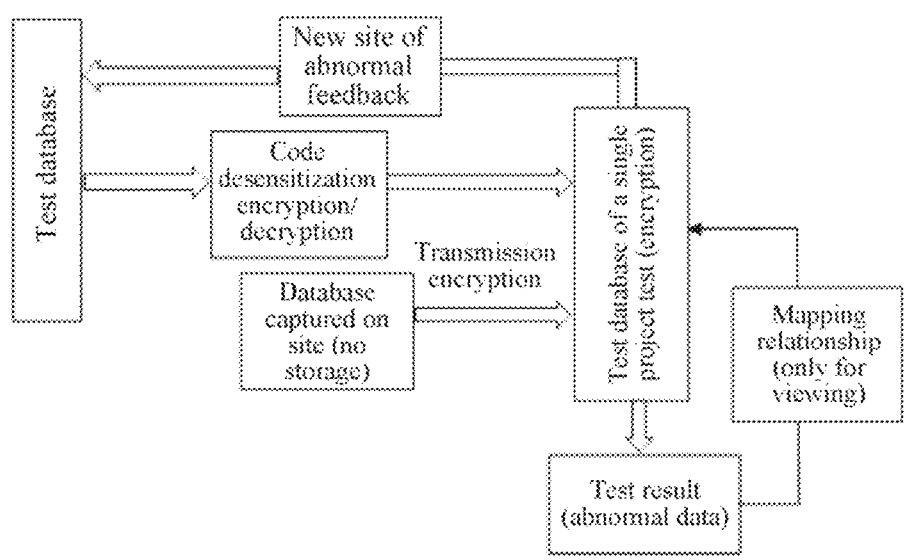
FIG. 5 is a schematic diagram of a face data security mechanism corresponding to an algorithm evaluation system according to the present invention.

The data set management module sets the data security mechanism to manage the total test database of the current test, as shown in FIG. 5.

The automatic test module calls the device interface calling module, the data preprocessing module, the database call module, and the data set management module to perform dock and cooperation to perform the "FAR and FRR" test.

Figure 6:
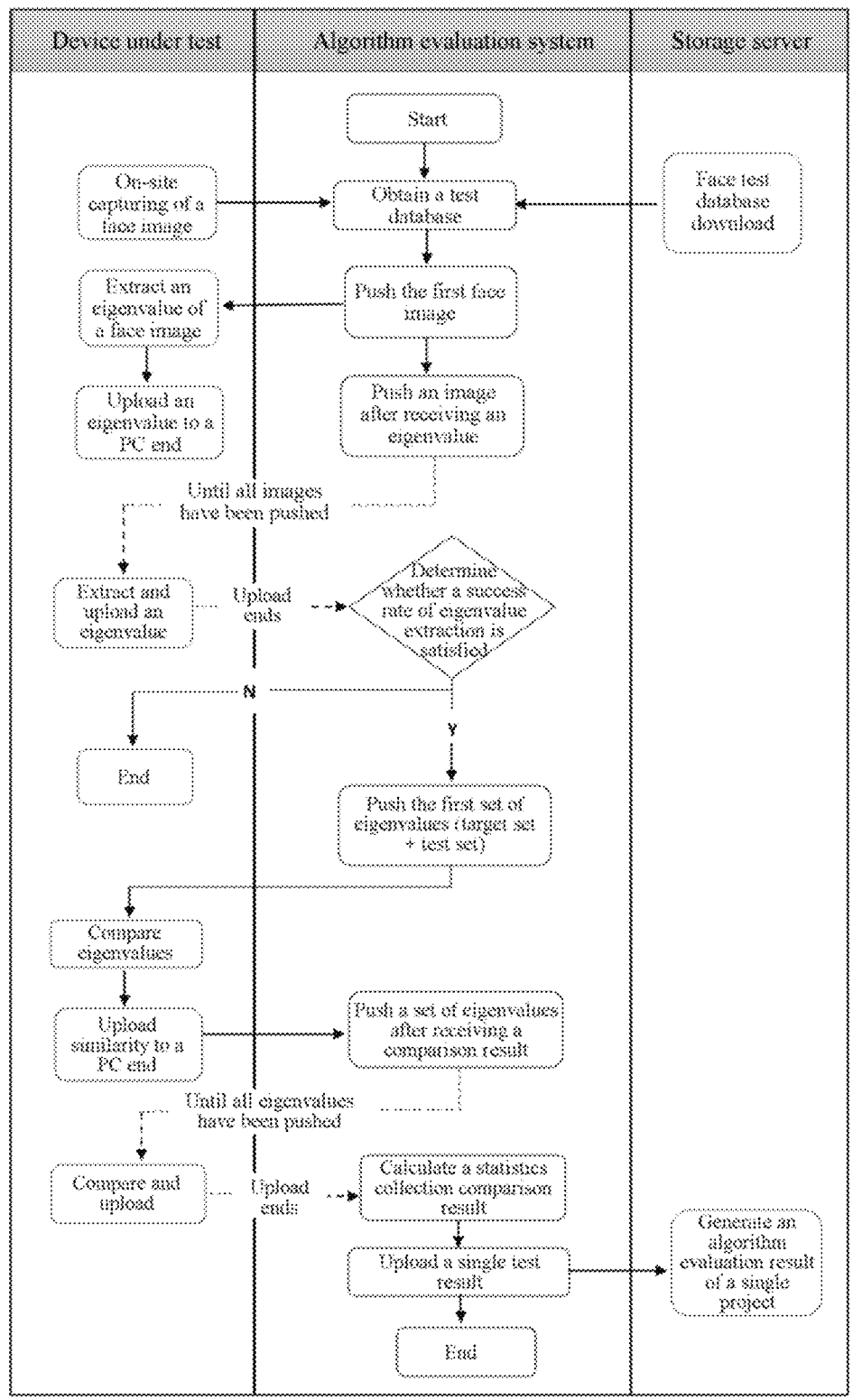
FIG. 6 is a flowchart of automatic test of performance indicators of false acceptance rate (FAR) and false rejection rate (FRR) in a test method according to the present invention.

Accordingly, this example uses the algorithm evaluation system to test the performance indicators of "false acceptance rate (FAR) and false rejection rate (FRR)" on the person and certificate verification device, including the following steps (refer to FIG. 6):

(7.1) A preset parameter such as a face recognition comparison threshold of the device is queried and recorded.

(7.2) Initialize the system and enter the database calling module; and select a test database with a corresponding data ratio and scale according to level requirements of the false acceptance rate and false rejection rate of the device.

(7.3) Debug the interface of the device under test through the device interface calling module by using the dynamic link database (.dll file) provided by the manufacturer, to implement interface call at least including an initialization algorithm, feature length obtaining, feature extraction, feature comparison and similarity returning, query, algorithm resource release, and version information obtaining.

(7.3) Enter the data preprocessing module, and for face images captured on site, perform data matching according to the requirement of the test database based on that on-site living body face images account for no less than 2% of the target set.

(7.4) Combine the databases from the two sources through the data set management module to obtain the test database for the current project test.

(7.5) Call the test interface function through the device function interface calling module, push each sample image in the target set in the current test database stored at the PC end to the device under test for feature value extraction, sequentially call the feature extraction interface to obtain and save a face feature file database 1, and record a total number N of samples in the target set, a total number C1 of successful feature extraction samples, and identity information of each sample image in the target set.

(7.6) Call the test interface function through the device function interface calling module, push each face image in the test set in the current test database stored at the PC end to the device under test for feature value extraction, sequentially call the feature extraction interface to obtain and save a face feature file database 1, and record a total number M of samples in the test set, a total number C2 of successful feature extraction samples, and identity information of each face image in the test set.

(7.7) Check one-to-one correspondence management of the results of step (7.5) and step (7.6), and determine that the numbers and the identifiers are consistent.

(7.8) Call the test interface function through the device function interface calling module, read the target set face feature file database 1 and the test set face feature file database 2 into the memory, compare feature data of each face image in the test set with feature data of each sample image in the target set as a set of data by calling the feature comparison function one by one, run the face recognition algorithm in the device under test, and record N×M comparison similarities, where the similarity value ranges from 0.0 to 1.0 (the similarity value is accurate to 4 decimal places), and the larger similarity value indicates the higher similarity.

(7.9) Among the recorded N×M comparison similarities, put all comparison similarities of the same person into similarity set S1, and put all comparisons of different persons into similarity set S2. A number of elements whose similarity is less than a threshold T in the similarity set S1 is a number of false rejections, denoted as N_R. A number of elements whose similarity is greater than the threshold T in the similarity set S2 is a number of false acceptances, denoted as N_A.

(7.10) Divide performance indicator requirements of "false acceptance rate FAR and false rejection rate FRR" into two levels: a basic level and an enhanced level. Devices of different levels meet the following requirements respectively:
  a) Basic-level device: under the condition of a same specified threshold, when the false acceptance rate (FAR) is less than or equal to 0.1%, the false rejection rate (FRR) is less than or equal to 5%.
  b) Enhanced-level device: under the condition of a same specified threshold, when the false acceptance rate (FAR) is less than or equal to 0.01%, the false rejection rate (FRR) is less than or equal to 5%.

On this basis, statistics of all feature comparison results is collected, and the false acceptance rate FAR and the false rejection rate FRR under a preset face comparison similarity threshold of the device are calculated according to formula (1) and formula (2). Besides, a test result of a single project is automatically generated and stored and uploaded, and calculation results thereof are used to determine whether the device meets the requirements of the corresponding performance indicators.

$$FAR = \frac{N_A}{N \times M - M} \times 100\% \qquad (1)$$

$$FRR = \frac{N_R}{M} \times 100\% \qquad (2)$$

When feature extraction failure rates of the target set and the test set are both 0%, C1=N in feature file database 1 and C2=M in feature file database 2. When the extraction failure rate is not 0%, (N−C1) and (M−C2) are included in NA and NR as the number of "feature extraction failures".

As can be seen from the above example, in the performance test solution of the person and certificate verification device provided by the present invention, in specific test applications, the method can support test databases of tens of millions and above, and support multi-platform and multi-thread synchronous operation. On the premise of ensuring secure usage of face information data in the test database, the method implements intelligence and automation of a test process, standardization and transparency of a test procedure, and intuitiveness and traceability of a test result. This not only greatly improves the test efficiency, but also improves the fairness and rationality of a performance test result of the person and certificate verification device. The method is of great importance to the promotion of technological progress of person and certificate verification devices and further widespread application of person and certificate verification devices.

The above-mentioned method of the present invention, or specific system units, or some units thereof can be deployed in electronic apparatuses such as hard disks, optical discs, smartphones, and computers through program code. When the electronic apparatuses load the program code and execute the program code, the corresponding electronic apparatuses become apparatuses for performing the present invention. In the above-mentioned method of the present invention test database information can also be transmitted in the form of program code through the network, and when the program code is received, loaded and executed by an electronic apparatus (such as a smartphone), the corresponding electronic apparatus becomes a remote apparatus for performing the present invention.

The basic principles, main features, and advantages of the present invention have been shown and described above. Those skilled in the industry should understand that the present invention is not limited by the above-mentioned embodiments. Descriptions in the above-mentioned embodiments and the specification only illustrate the principle of the present invention. The present invention also has various variations and improvements without departing from the spirit and scope of the present invention, which shall fall within the scope claimed in the present invention. The protection scope claimed by the present invention is defined by the appended claims and their equivalents.

What is claimed is:

1. An algorithm evaluation system for a performance test of a person-and-certificate verification device, the algorithm evaluation system comprising a database calling module, a data preprocessing module, a device interface debugging module, an automatic test module, a quality evaluation module, a data set management module, and an image algorithm module; wherein
  the device interface debugging module is configured to debug an interface function of a device-under-test through an API dynamic link database file and an algorithm configuration file provided by a manufacturer of the device-under-test, and is configured to push, in an automatic test process of the automatic test tool module, face images in a target set and a test set to the device-under-test to run a face recognition operation and obtain a test result;
  the database calling module, the data preprocessing module and the data set management module cooperate to form a systematic data set source, and are configured to download a large-scale face test database and/or collect and preprocess an on-site face test database;
  in a computer or server environment, the automatic test module is configured to call, through a test program, a face recognition module running on the device-under-test, to perform a performance indicator test of false acceptance rate (FAR) and false rejection rate (FRR); and
  the quality evaluation module is configured to call the image algorithm module to perform a face image quality evaluation performance indicator test on an on-site living body face image collected by the device-under-test, and is configured to perform the face image quality evaluation performance indicator test on a certificate visual face image collected by the device-under-test.

2. The algorithm evaluation system according to claim 1, further comprising
a function module configured to perform user hierarchical right management, wherein
the function module comprises one or more of a user login module, a project registration module, and a user management module.

3. The algorithm evaluation system according to claim 1, further comprising
an information statistics collection module configured to perform data analysis and processing of test results, wherein
the information statistics collection module comprises one or more of a test result module, a project management module, a project statistics collection module, and an algorithm statistics collection module.

4. The algorithm evaluation system according to claim 1, wherein
the automatic test module, the device interface debugging module, the data preprocessing module, the database calling module, and the data set management module cooperate to perform a false acceptance rate (FAR) and false rejection rate (FRR) performance test on the device-under-test.

5. The algorithm evaluation system according to claim 1, wherein
the device interface debugging module obtains a face recognition algorithm test interface of the device-under-test,
the data preprocessing module preprocesses a face image captured by the device-under-test on site and then uses the preprocessed face image as on-site capturing database in a current test database,
the data calling module calls and downloads the current test database required for the current test,
the data set management module sets a data security method to manage a total test database of the current test, and
the automatic test module calls the automatic test module, the device interface debugging module, the data preprocessing module, the database calling module, and the data set management module, to perform a false acceptance rate (FAR) and false rejection rate (FRR) performance test.

6. The algorithm evaluation system according to claim 1, wherein
the quality evaluation module, the device interface debugging module, the data preprocessing module, and the image algorithm module cooperate to perform image quality evaluation on the face image captured by the device-under-test on site.

7. The algorithm evaluation system according to claim 6, wherein
the device interface debugging module obtains and uploads living body face image, a certificate image, or a certificate visual face image captured by the device-under-test on site,
the data preprocessing module performs a face test on the image obtained by the device interface debugging module,
the quality evaluation module performs a face image quality evaluation on an uploaded image by calling the image algorithm module,
the image algorithm module performs, according to a specified technical requirement, automatic test on the face image captured on site and exported by the device-under-test, and
the quality evaluation module performs analysis processing in cooperation with data generated by the image algorithm module and provides a compliance evaluation.

8. A test method for a computer-implemented system to perform a performance test of a person-and-certificate verification device, comprising:
downloading by the computer-implemented system one or more test databases and sequentially pushing, by the computer-implemented system, the test databases to a device-under-test, according to a data security mechanism, and sequentially pushing, by the computer-implemented system, to the device-under-test according to a configuration rule, a downloaded large-scale face test database and a preprocessed database, to perform a face algorithm operation including face recognition performance of a person; and
controlling by the computer-implemented system through a test function interface, to perform a performance indicator test including at least one of feature extraction and feature comparison of the device-under-test, and obtaining by the computer-implemented system a test result; and
performing by the computer-implemented system encryption and desensitization of face image data based on a mapping relationship, face data in a face test database, of the test databases, being ensured not to be reused after being exported from the device-under-test, thereby ensuring secure usage of the face data in the face test database.

9. The test method according to claim 8, further comprising
performing an image quality performance test on a face image captured by the device-under-test, including:
performing an automatic test on a living body face image captured on site, and obtaining an image quality evaluation result through analysis processing by a quality evaluation module, and
performing an automatic test on a captured certificate visual face image, and obtaining an image quality evaluation result through analysis processing by the quality evaluation module.

10. The test method according to claim 8, further comprising
performing a false acceptance rate (FAR) and false rejection rate (FRR) performance indicator test of the person-and-certificate verification device.

* * * * *